(12) United States Patent
Michel et al.

(10) Patent No.: US 6,913,325 B2
(45) Date of Patent: Jul. 5, 2005

(54) ELECTRICALLY OPERABLE VEHICLE PARKING BRAKE DRIVE

(75) Inventors: Mark Michel, Greer, SC (US); Robert Shepherd, Pelzer, SC (US); James Wasness, Inman, SC (US)

(73) Assignee: Ellcon National, Inc., Greenville, SC (US)

( * ) Notice: Subject to any disclaimer, the term of this patent is extended or adjusted under 35 U.S.C. 154(b) by 0 days.

(21) Appl. No.: 10/660,351

(22) Filed: Sep. 11, 2003

(65) Prior Publication Data

US 2004/0150259 A1 Aug. 5, 2004

Related U.S. Application Data

(60) Provisional application No. 60/445,166, filed on Feb. 5, 2003.

(51) Int. Cl.[7] .............................................. B60T 13/74
(52) U.S. Cl. ............................ 303/2; 303/20; 188/34; 188/162
(58) Field of Search .................... 303/2, 7, 20; 188/3 R, 188/3 H, 29, 33, 34, 57, 156, 162

(56) References Cited

U.S. PATENT DOCUMENTS

| | | | | | |
|---|---|---|---|---|---|
| 829,032 | A | * | 8/1906 | Pfingst | 188/156 |
| 1,491,753 | A | * | 4/1924 | Sauvage | 188/156 |
| 4,291,793 | A | * | 9/1981 | Klasing | 192/95 |
| 6,039,158 | A | * | 3/2000 | Fox et al. | 188/162 |
| 6,427,811 | B1 | * | 8/2002 | Wedge et al. | 188/162 |

* cited by examiner

*Primary Examiner*—Pam Rodriguez
(74) *Attorney, Agent, or Firm*—Norris, McLaughlin & Marcus

(57) ABSTRACT

An electrically or manually operable brake drive for the brakes of a vehicle which has a gear train optionally driven by a reversible electric motor or a manual member. The brakes can be set or released by the electric motor without manual changing of the drive components permitting setting and releasing of the brakes at a location remote from the drive. For maintaining the brakes in a "set" mode, the drive includes a gradual release detent mechanism which permits rotation of the gears in the brake setting direction but opposes such rotation in the opposite direction unless a drive shaft rotatable by the motor or the manual member is rotated in the brake release direction.

22 Claims, 11 Drawing Sheets

TO BRAKE RIGGING

TO BRAKE RIGGING

ELECTRICALLY OPERABLE VEHICLE PARKING BRAKE DRIVE

RELATED APPLICATION

The benefit of priority of provisional application No. 60/445,166 filed Feb. 5, 2003 is claimed and the application is incorporated herein by reference

FIELD OF THE INVENTION

The invention relates to a drive for the braking apparatus of a vehicle with wheels. The drive is operable either manually or by an electric motor. Such a drive operable only manually is commonly known as a hand brake or a parking brake.

BACKGROUND OF THE INVENTION

Although applicable to other types of vehicles, the invention will be described in connection with railroad or railway vehicles, such as railway cars, locomotives, etc.

Railway vehicles usually have brake shoes engageable with the vehicle wheels. Such shoes are forced against the wheels by an air operable piston and cylinder assembly acting through a brake rigging mounted on the vehicle and connected to the shoes. Such brake shoe operation is used to slow the vehicle down or to bring the vehicle to a halt.

However, when the vehicle is to be parked for any significant period of time, such as in a terminal, freight yard, etc., the system described hereinbefore is not used, and instead, the vehicle is prevented from moving by applying braking force to the shoes by driving apparatus which can be operated manually and locked in the status which continuously applies the braking force. Usually, the driving apparatus is connected to the brake shoes through at least a portion of the brake rigging mentioned hereinbefore. See, for example, U.S. Pat. Nos. 829,032; 3,176,539 and 4,291,793.

Parking brake drives which can be actuated either manually or by the energization of an electric motor have been proposed. See, for example, U.S. Pat. Nos. 829,032; 1,491,753; 6,039,158 and 6,427,811.

Typically, a parking brake drive comprises a stamped or cast hand wheel, a stamped or cast steel housing enclosing at least two steel gears and a chain which attaches to the vehicle brake rigging and to a chain gear in the housing. See, for example, U.S. Pat. No. 3,176,539. The parking brake is applied by rotating the hand wheel in a clockwise direction which causes a gear train inside the housing to rotate. The last gear in the system is attached to one end of the chain by either a pin or a pocketed drum, which fits the chain. As the hand wheel is rotated and the gear train rotates, the chain is wound onto the drum causing the vehicle brake system to apply braking force to wheels of the vehicle.

Typically, the rail industry standard is that the application of 125 pounds of force to the rim of the hand wheel will set the parking brake. The requirement of being able to apply 125 pounds to the hand wheel is quite demanding. A weaker person cannot readily release the hand brake if a stronger person has applied it. The parking brake can be set with more uniformity using an electrically operable gear motor to drive the gear train. This allows the parking brake to be set without the possibility of injury to the operator.

In addition, it is desirable to be able to set and release the brakes coupled to the brake drive by either operation of the motor drive or of the manual drive.

The hand brake drive described in U.S. Pat. No. 6,427,811 requires an electrically operable clutch for the electrical motor drive and a ratchet wheel and pawl coupling of the manually operable handle which depends upon the position of the handle. The drive also requires a second ratchet wheel and pawl operable by a solenoid to hold the brakes in their "set" positions and to release the brakes whether the brakes are "set" by the motor drive or manually. Therefore, the drive requires two ratchet wheel and pawl mechanisms and two electrically operable, physically movable components in the housing which is subject to the accumulation of dust, grease, etc. In addition, if the manual handle does not happen to be in a vertical position, or its ratchet wheel and pawl connection is defective, the handle will move when the brakes are released and slam against the housing and not only create a hazard to operating personnel but also prevent release of the brakes.

The hand brake drive described in U.S. Pat. No. 6,039,158 also requires an electrically operable clutch which slips when the brakes are set, and two ratchet wheel and pawl mechanisms in the housing, one of which, the ratchet handle mechanism, is dependent on the handle position and the other of which can be released only manually. Thus, the drive is not entirely satisfactory for reasons that the drive of U.S. Pat. No. 6,427,811 is not entirely satisfactory. In addition, the brakes can be released only by manually pulling a release handle at the housing whether the brakes are set manually or by the motor drive.

It is not desirable that the manual drive, e.g. the hand wheel or handle move when the brakes are released to avoid injury to train crew and that the brakes be settable and releasable either by the motor drive or the manual drive. It is also desirable to have an indicator which indicates the status of the brakes and which can be located remotely from the parking brake drive, e.g. if the parking brake drive is on a locomotive at a portion remote from the engineer's cab, it is convenient and/or desirable to locate the indicator and the motor drive control in the cab.

BRIEF SUMMARY OF THE INVENTION

The parking brake drive of the invention comprises a gear train which can rotate a chain drum and which can be operated to set or release the brakes either manually or by an electric motor. The chain drum is connected to a chain which is also connected to the wheel brake shoes of a wheeled vehicle through a brake rigging.

In a preferred embodiment, the gear train is driven by either an electric motor or a hand wheel, and when the electric motor is energized, the hand wheel does not rotate. Conversely, when the gear train is being driven by the hand wheel, the electric motor is disengaged from part of the gear train.

In the preferred embodiment, when the brakes have been set by driving the gear train so that the brakes engage the vehicle wheels, the gear train is held in the "set" position by a pawl and ratchet gear or wheel coupled to the gear train by a releasable mechanism which is not electrically operable and which can be released by either the hand wheel or the electric motor to release the brakes. When the brakes are released by operation of the electric motor, it is unnecessary to manually operate a lever at the hand brake or to electrically release a pawl from a ratchet wheel, such as by means of an electrically operable solenoid.

In the preferred embodiment, the electric motor is coupled to a gear drive shaft by a pair of interengageable members which, when they are engaged, cause the electric motor to rotate the drive shaft but not rotate the hand wheel. The hand wheel has a control or lever which controls the position of one of the interengageable members to disconnect it from the other interengageable member so that the electric motor is no longer coupled to the gear train and the hand wheel can operate the gear train without rotating the motor armature.

In the preferred embodiment, the electric motor energization is controlled by a microcontroller which is coupled to the motor, a control box, a proximity sensor and a limit switch. The control box can be at or adjacent the housing for the parking brake drive or can be located at a remote point, such as in a locomotive cab.

The proximity sensor and the limit switch are mounted in the drive housing. The proximity sensor is responsive to movement of one of the interengageable members by the hand wheel control and causes the microcontroller to prevent operation of the electric motor. The limit switch is controlled by the chain drum and causes the microcontroller to deenergize the electric motor when the brakes are released.

In the preferred embodiment, the current drawn by the electric motor is dependent on the motor load which, in turn, is dependent on the braking force applied by the brakes. The microcontroller compares the amount of the motor current with an adjustable preset standard and when the motor current reaches a preset level, the microcontroller deenergizes the electric motor. Thus, the amount of braking force applied to the brakes can be adjusted.

In addition to switches for electrical operation of the motor, e.g. "apply brakes" and "release brakes", the controller can have indicator lights which indicate the status of the drive apparatus.

BRIEF DESCRIPTION OF THE DRAWINGS

The invention will be better understood when considered in connection with the following detailed description of preferred embodiments and the accompanying drawings in which.

DETAILED DESCRIPTION OF PREFERRED EMBODIMENT

Although the invention can be used with other types of parking brake drives, the invention will be described in connection with a drive known in the art as a gradual release mechanism or drive for hand operable parking brakes, such as the drive described in U.S. Pat. No. 2,618,169. The latter drive is advantageous in that the brakes can be gradually released manually and the hand wheel does not spin out of control of the operator when the brakes are being released. In the preferred embodiment of the invention, the brakes can be "set" or "released" either by energizing an electric motor or by manual operation of a manually operable member, e.g. a hand wheel. In the electrical operating mode, the hand wheel can remain stationary, and the brakes can be set or released remotely from the drive, i.e. without any manual change or adjustment of the drive. In the manual operating mode, the electric motor is mechanically disconnected from the gear which is connected to the brakes so that the electric motor is not driven when the hand wheel is rotated. In either mode, the brake release is gradual.

Figure 1:
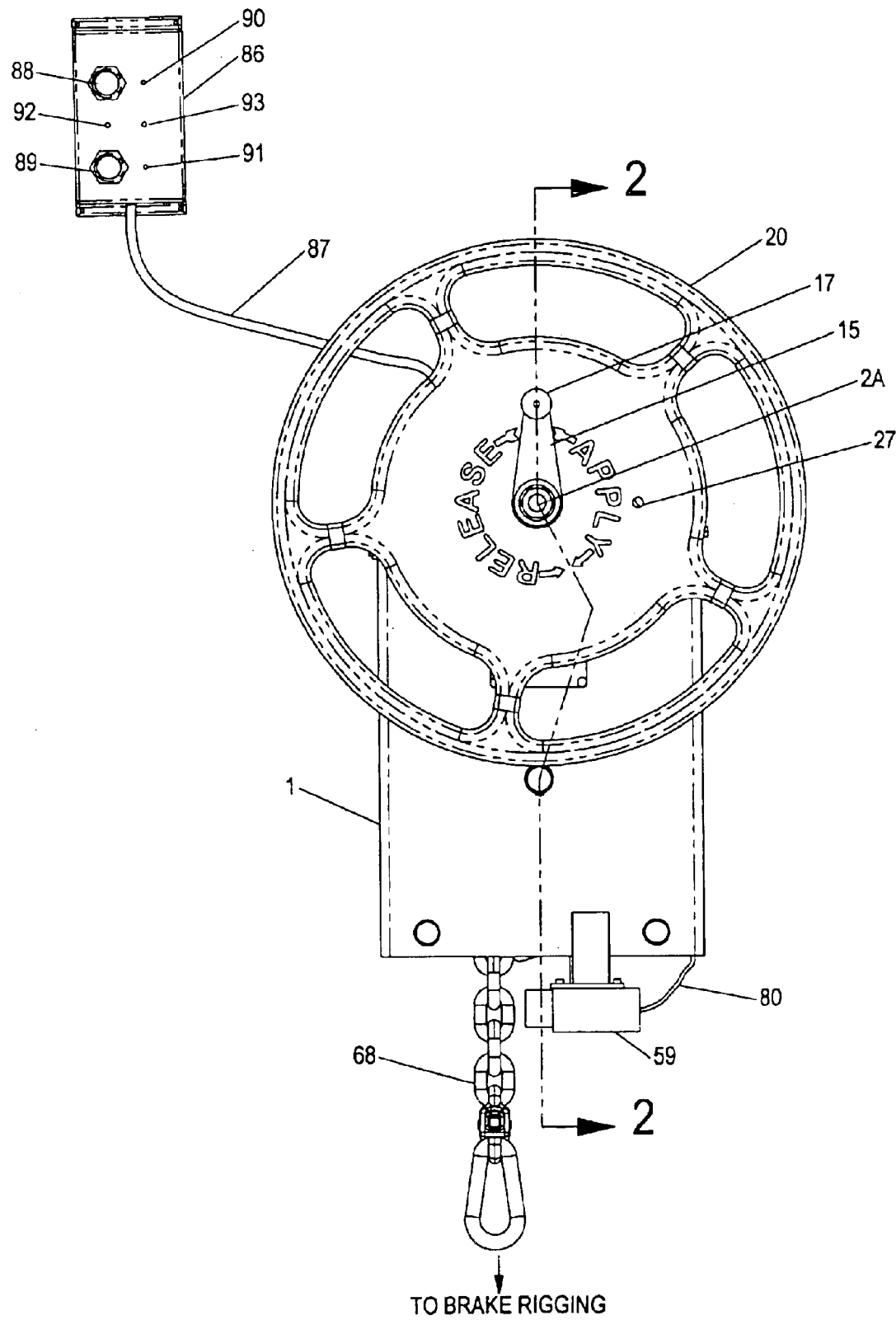
FIG. 1 is a front elevation view of an embodiment of the parking brake drive of the invention with a manually operable hand wheel.

With reference to FIG. 1, the preferred embodiment of the parking brake drive comprises a housing 1 on which a hand wheel 20 is rotatably mounted. A lever 15 with a spring biased knob 17 is rotatable counterclockwise (as viewed in FIG. 1) about the same axis 2a as the wheel 20 from the position shown in FIG. 1, in which the drive is in the electrical operating mode to a position in which a plunger 16 (see FIG. 2) controlled by the knob 17 enters an opening 27 in which position the drive is in the manual operating mode. The wheel 20 is rotated clockwise, as viewed in FIG. 1, to manually set the brakes, or counterclockwise to manually release the brakes.

A chain gear (hereinafter described) within the housing 1 is coupled to a force transmitting means, a chain 68 or other conventional means, which is connected to the actuating mechanism, such as a brake rigging (not shown), to actuate the vehicle brakes (not shown). To limit the movement of the chain 68 in the brake release direction (outwardly of the housing 1), a limit switch 59 (hereinafter described) is mounted on the housing 1.

In the preferred embodiment, manually operable switches and brake status indicators are provided in connection with the drive. For example, the switches and indicators may be mounted in a control box 86 electrically coupled to an electric motor control (hereinafter described) within the housing 1 by an electrical cable 87. The control box 86 can be mounted at or adjacent the housing 1, but usually it will be mounted at some place remote from the housing 1, such as in the cab of a locomotive. Of course, the switches and status indicators can be mounted on a panel, such as the control panel in the cab of a locomotive, rather than in a separate housing as shown in FIG. 1.

The switches and status indicators can be, for example, a brake apply switch 88, a brake release switch 89, a brake apply light 90, a brake release light 91, a manual mode light 92 and a power on light 93.

Figure 2:
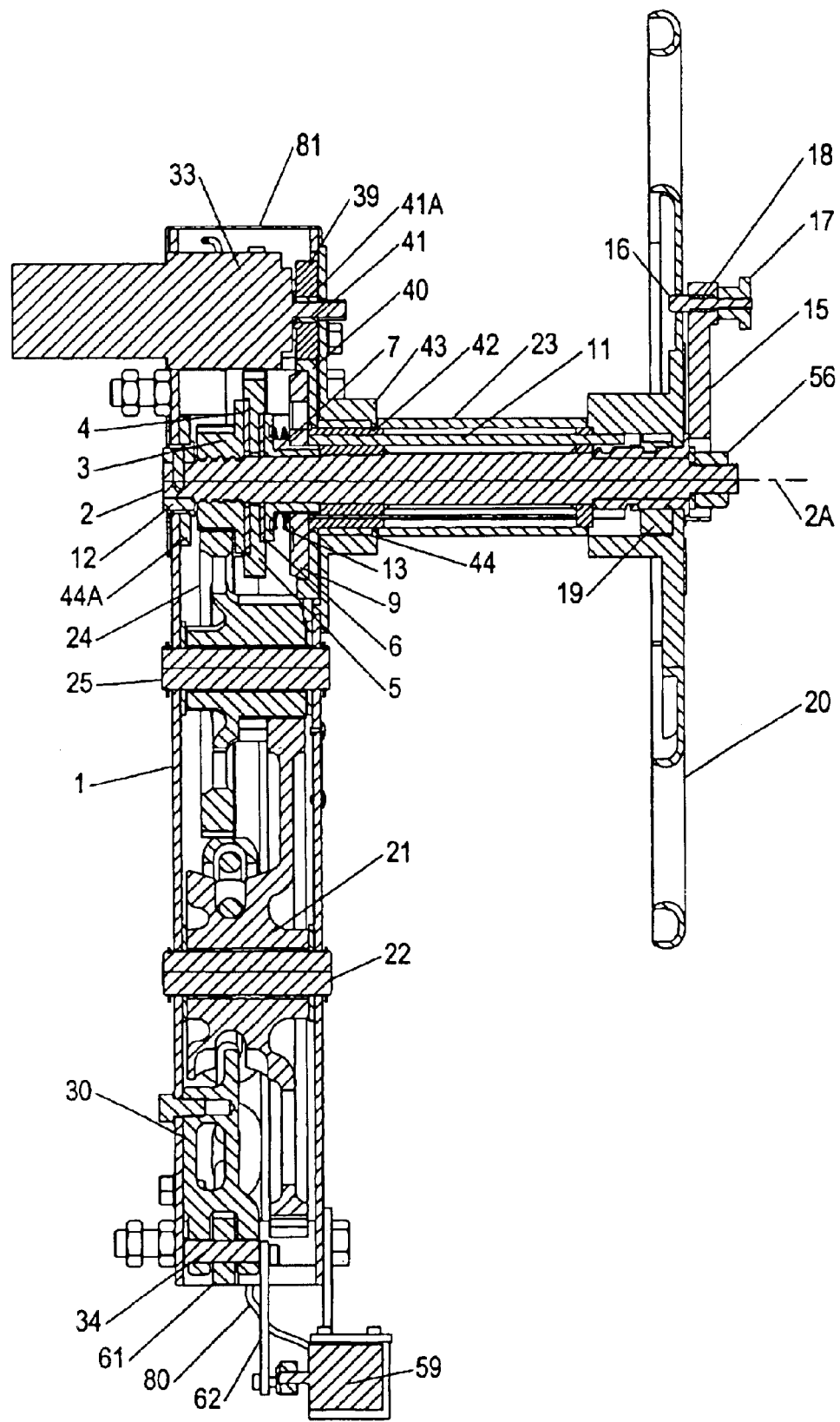
FIG. 2 is a cross-sectional view, taken along the line 2—2 of FIG. 1, of the drive illustrated in FIG. 1 with the drive in the electrical mode.
Figure 6:
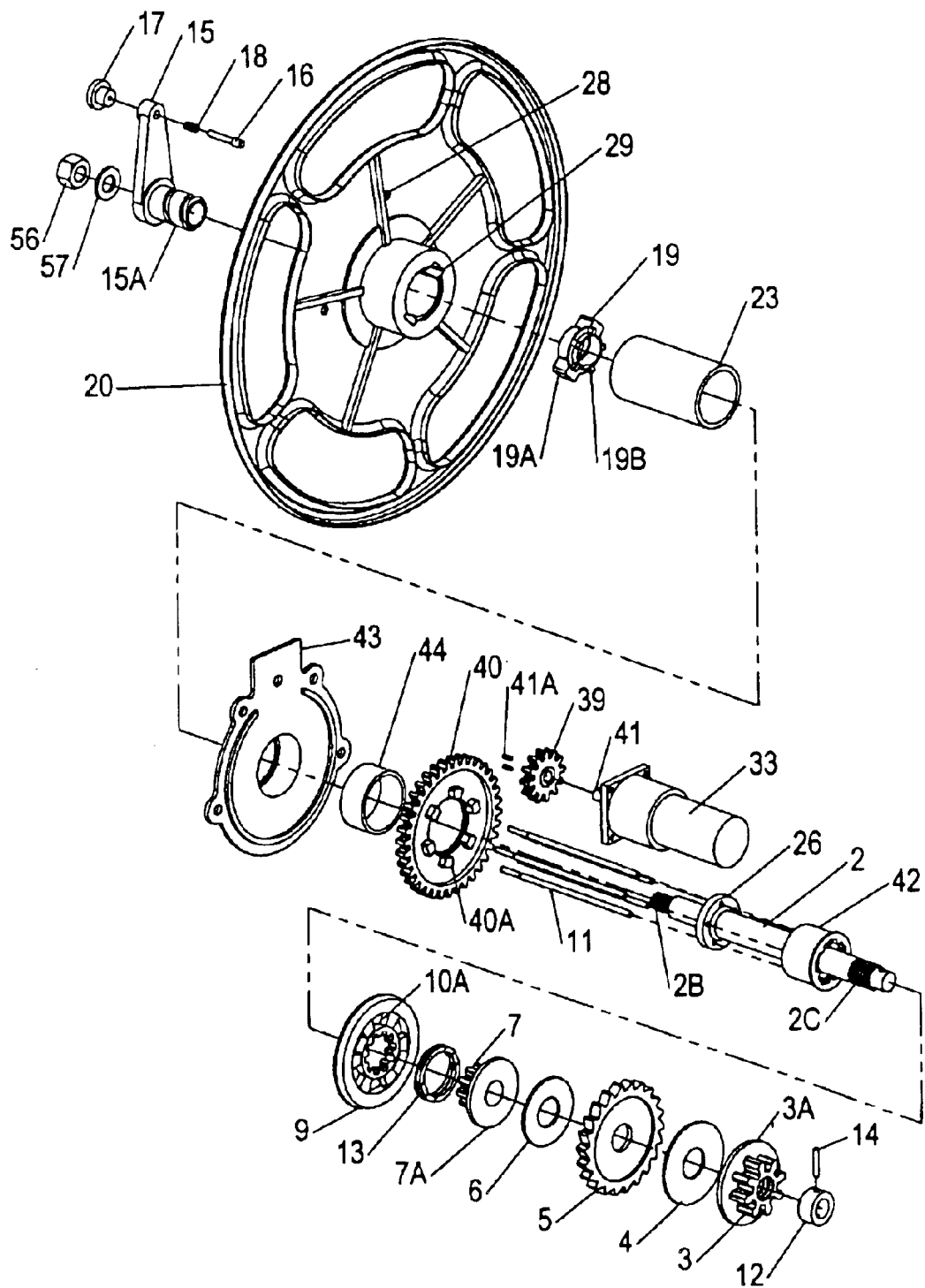
FIG. 6 is an exploded view of mechanical parts of the drive illustrated in FIGS. 1–5.

With reference to FIGS. 2 and 6, the preferred embodiment of the brake drive comprises a drive shaft 2 having an axis of rotation 2a and rotatably mounted on the housing 1 by a plate 43 secured to the housing 1, a push rod guide collar 42 and a collar 44 and by a bearing plate 44a secured to the housing 1. Intermediate the shaft 2 and the bearing 44a, there is a collar 12 which is secured to the shaft 2, such as by a pin 14, for rotation with the shaft 2.

The shaft 2 has a portion 2b at its end nearest the hand wheel 20 with threads for receiving a securing nut 56 and a washer 57. The portion 2c of the shaft 2 adjacent to the collar 12 has threads for loosely receiving an internally threaded pinion gear 3 having a flange 3a which acts as cam means for purposes hereinafter described.

The teeth of the pinion gear 3 drivingly engage a set of the teeth of an intermediate gear 24, or double gear, which is rotatably mounted on a shaft 25, which has teeth drivingly engaging the teeth of a gear 21 which is rotatably mounted on a shaft 22 which is coupled to the force transmitting means, the chain 68, for setting or releasing the vehicle brakes depending upon the direction of rotation of the gear 21. Preferably, the gear 21 has pockets for receiving the links of the chain 68 as the chain 68 is pulled to set the brakes. The chain can be coupled to the gear 21 in any conventional manner, such as by a pin.

The preferred embodiment of the drive comprises a unidirectional detent mechanism comprising a ratchet wheel 5 rotatable on the shaft 2 and a pawl 45 biased by a spring 8 (see FIG. 4) mounted on the housing and engaging the ratchet wheel 5. The pawl 45 prevents rotation of the wheel 5 in the brake release direction, i.e. when the shaft 2 is rotated counterclockwise direction as viewed from the wheel 20 end in FIG. 2.

The preferred embodiment also comprises a coupling mechanism for coupling the ratchet wheel 5 to the shaft 2 when the shaft 2 is rotated in the brake applying direction, i.e. clockwise as viewed from the wheel 20 end in FIG. 2, and for decoupling the wheel 5 from the shaft 2 when the shaft 2 is rotated in the opposite, brake release direction. The coupling mechanism comprises a driver gear 7, with a flange 7a, which is secured to the shaft 2 both with respect to rotation and with respect to axial movement in any conventional manner, e.g. a pin or welding.

The coupling mechanism also comprises a friction disc 6 of a known type between the flange 7a and the ratchet wheel 5 and a similar, or the same type, friction disc 4 between the flange 3a of the gear 3 and the ratchet wheel 5.

Thus, when the shaft 2 is rotated in the brake applying direction, the gear 3 moves axially of the shaft 2 toward the ratchet wheel 5 because of the threads 2c on the shaft 2 and the mating internal threads of the gear 3 and because, at least during the initial rotation of the shaft 2, rotation of the gear 3 is opposed by the gear 24. With continued rotation of the shaft 2 in the brake applying direction, the ratchet wheel 5 is clamped between the discs 4 and 6 and rotates with the shaft 2 and remains clamped therebetween until the direction of rotation of the shaft 2 is reversed. Therefore, until the direction of rotation of the shaft 2 is reversed by the hand wheel 20, or as hereinafter described, by an electric motor 33, the shaft 2 is prevented by the ratchet wheel 5 and the pawl 45 from rotating in the brake release direction. Accordingly, since the shaft 2 and the gear 3 cannot rotate in the brake release direction, the brakes will remain "set" in the positions to which they have been "set" by rotation of the drive shaft 2.

However, when the drive shaft 2 is rotated in the brake release direction by the hand wheel 20, or the motor 33, the gear 3, because of its threaded connection with the threads 2c on the shaft 2, will move axially away from the ratchet wheel 5 thereby uncoupling the ratchet wheel 5 from the shaft 2. If the shaft 2 is continuously rotated in the brake release direction, release of the brakes will be substantially continuous until the brakes are fully released. On the other hand, if, due to the pull of the chain 68 by the brakes, the speed of rotation of the double gear 24 causes the drive gear 3 to rotate faster than the rotation of the shaft 2, the ratchet wheel 5 will again be clamped to the shaft 2 which will stop rotation of the shaft 2. Accordingly, the brakes can be released in increments or gradually. Also, the hand wheel 20 will not "spin" by itself and, possibly, endanger an operator.

For operation of the drive in the electrical mode, an electrically operable motor 33 is provided and is mounted on the housing 1 in any conventional manner. Preferably, the motor 33 is coupled to the gear train and the shaft 2 by a drive member comprising the rotor shaft 41 and a pinion gear 39 non-rotatably secured to the rotor shaft 41, such as by a key 41a. Although the rotor 41 could be coupled to the gear 39 by an electrically operable clutch and/or an electrically operable rotation reversing mechanism, such added components increase the cost of the drive and increase the possibility of problems with the drive over the life of the drive and under installed conditions. Accordingly, and preferably, the motor 33 is an electrically reversible motor, i.e. the direction of rotation of the shaft 41 is controlled by selecting the electrical energization of the motor 33.

It is desirable that the rotor of the motor 33 be disconnected from the drive shaft 2 when the drive is in the manual mode not only because the rotor would be unnecessarily rotated at a high speed, due to the gear ratios, but also because the rotor and its related gearing requires a greater manual force at the wheel 20 when the brakes are being applied. If an electrically operable clutch is used as part of the motor drive member, such greater force can be avoided by opening the clutch electrically at the time that the manual mode is used, but for reasons set forth hereinbefore, it is preferable that such a clutch not be included.

In the preferred embodiment of the drive of the invention, there is a mechanically releasable coupling between the motor drive member and the drive shaft 2. The pinion gear 39 has teeth engaging the teeth of a specially formed intermediate gear 40 which has axial projections 40a which can be received in circumferential slots 10A in an internally toothed gear 9. The internal teeth of the gear 9 interengage with the teeth on the driving gear 7 and the gear 9 is axially slidable with respect to the gear 7. Until moved toward the gear 7 by rods 11 (hereinafter described), the gear 9 is urged toward the gear 40 by a spring 13 so that the projections 40a are in the slots 10A. As the gear 40 is rotated by the gear 39, and hence, the motor 33, the projections 40A cause the gear 9 to rotate which, in turn, causes the drive gear 7, and hence, the shaft 2, to rotate.

When the gear 9 is moved toward the gear 7 by a sufficient amount, the projections 40a are out of the slots 10A, and therefore, rotation of the gear 40 does not cause rotation of the gear 7 and the shaft 2 and conversely, rotation of the shaft 2 does not cause rotation of the gear 40, the gear 39 and the rotor shaft 41.

Figure 3:
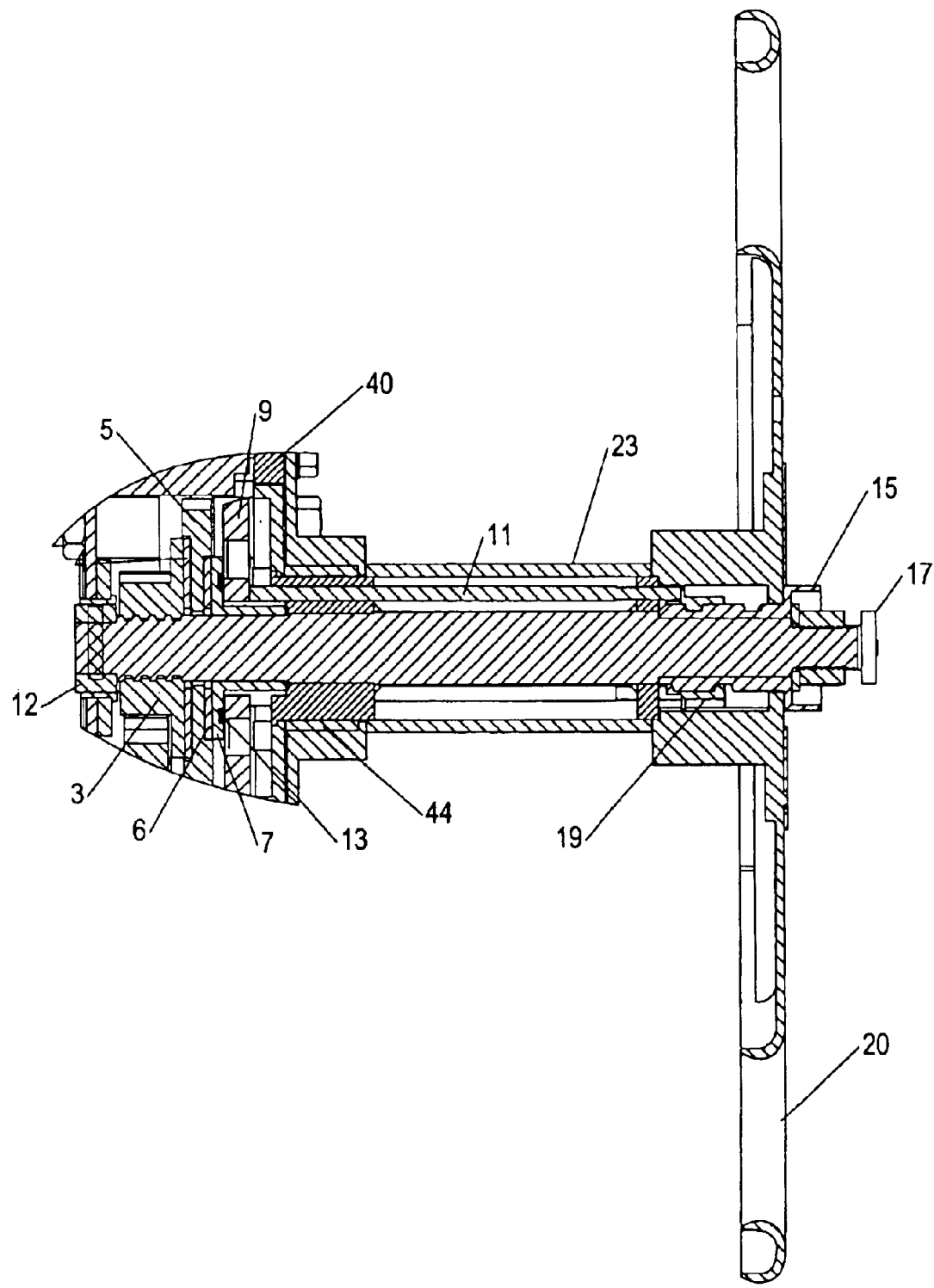
FIG. 3 is a cross-sectional view of a portion of the drive shown in FIG. 2 with the drive in the manual mode.

The lever 15 has a threaded projection 15a and slidably receives a plunger 16 secured to the knob 17 and biased toward the wheel 20 by a spring 18. By pulling the knob 17 in the direction away from the wheel 20, the plunger 16 is pulled out of an opening 28 in the wheel 20 permitting the lever to be rotated counterclockwise from the position shown in FIG. 1 (electrical mode) to the position shown in FIG. 3 (manual mode). The projection 15a is rotatably mounted on the shaft 2.

A follower 19 with internal threads which mate with the threads on the projection 15a is mounted on the projection 15a. The follower 19 has ears 19a which are slidably received in axial slots 29. The follower 19 also has axial projections 19b for purposes hereinafter described. The threads on the projection 15a and internally of the follower 19 act as cam means for axially moving the follower 19. Thus, in the electrical or automatic mode (FIGS. 1 and 2) of the lever 15, the follower 19 is moved toward the lever 15 and in the manual mode (FIG. 3), the follower 19 is moved away from the lever 15 by movement of the lever counterclockwise 270° around the axis 2a.

The wheel 20 is spaced from the bearing plate 43 by a sleeve 23. When the lever 15 is in the electrical, or automatic mode, position, the wheel 20, the follower 19 and the lever 15 are free to rotate with respect to the drive shaft 2 and conversely, rotation of the shaft 2 does not compel the wheel 20 to rotate with the shaft 2.

The preferred embodiment includes a plurality of push rods 11 which are slidably received in openings in a collar 26 secured to the shaft 2 so as to rotate therewith. The rods 11 pass through openings in the guide 42 and the ends thereof farthest from the wheel 20 engage the gear 9. When the rods 11 are moved to the left, as viewed in FIG. 2, the gear 9 is moved to the left separating the gear 9 from the gear 40 so that the gear 9 is not driven, and does not drive the gear 40. Therefore, the shaft 2 can rotate without rotating the rotor shaft 41 of the motor 33.

The rods 11 are so pushed to the left by the follower 19 when the lever 15 is moved from the electrical or automatic mode position to the manual mode position as described hereinbefore. At the same time, the projections 19a on the follower 19 enter in-between the ends of the rods 11 nearest the follower 19 so that when the wheel 20 is rotated, the rods 11 are caused to move around the axis 2a of the drive shaft 2 which, by reason of the collar 26 secured to the shaft 2, causes rotation of the shaft 2. When the shaft 2 is so rotated, the movement of the gear 3 and other gears and the clamping of the ratchet wheel 5 are as described hereinbefore in connection with the rotation of the shaft 2 by the motor 33. Thus, the vehicle brakes can be set or released by rotation of the hand wheel 20 and retained in the "set" position by the ratchet wheel 5 and the pawl 45 without causing rotation of the rotor shaft 41.

Preferably, the motor 33 is a direct current motor, direct current being available on railroad vehicles, such as a locomotive. The direction of rotation of its rotor shaft 41 is selectable by selecting the polarity of the voltage applied to the motor windings. In such case, the control box 86 could merely be a pair of switches, possibly with indicator lights, which control the polarity of the voltage applied to the motor 33 for setting and releasing the brakes electrically. However, it may also be desirable to provide other functions for the electrical mode such as limiting the force applied to the brakes, preventing operation of the motor 33 when the drive is in the manual mode and stopping of the motor 33 when the brakes are fully released. For such purposes, we have found that it is convenient to provide a solid state control system including solid state devices. Accordingly, although optional, the preferred embodiment of the drive of the invention includes a control box 74 (see FIG. 4) which includes electronic control circuits and which is mounted on, preferably within, the housing 1. Such circuits will be described hereinafter in connection with FIG. 7a or 7b.

Figure 4:
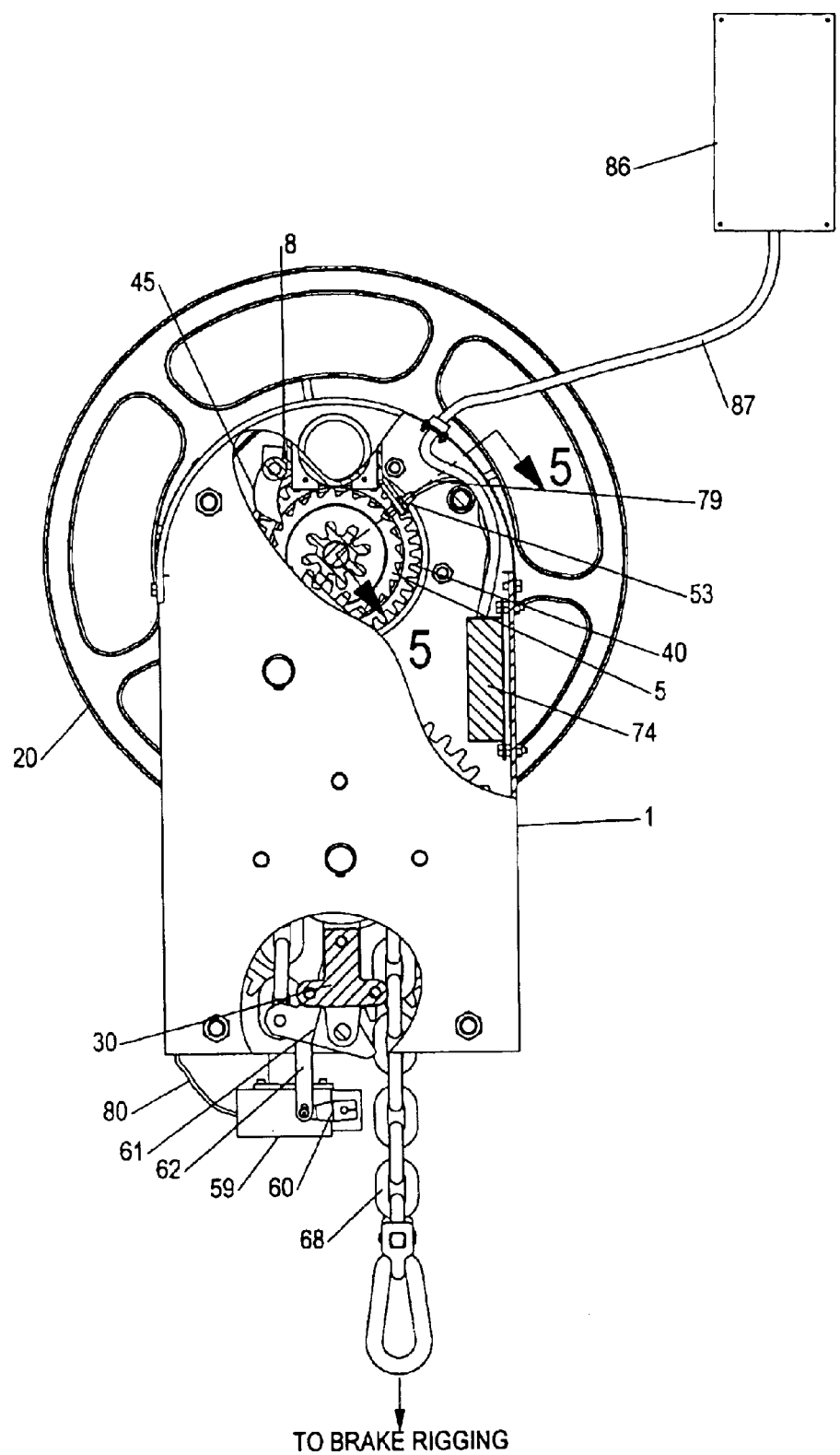
FIG. 4 is a rear elevation view of the drive shown in FIG. 1 with portions of the housing removed to expose interior parts.

With reference to FIG. 4, in a preferred embodiment, a heavy duty limit switch 59 is mounted on the housing 1 and electrically coupled by an electrical cable 80 to the circuits in the control box 74 so that when the brakes are fully released, electrical power to the motor 33 is discontinued. A link 62 is connected to the actuating arm 60 of the switch 59 so that when the link 61, pivotally mounted on a support 30 by a shaft 34, is moved by the last link of the chain 68, to which the link 61 is coupled in any conventional manner, reaches a position in which the brakes are fully released, the switch 59 is actuated, e.g. closes its contacts. Alternatively, the switch 59 can be replaced by a sensor switch of the type described hereinafter which senses when the last link of the chain 68 has reached its fully released position and stops the motor 33 in the same manner as the motor 33 is stopped by the switch 59.

Various methods can be used to de-energize the motor 33 or prevent the drive member operated thereby from driving the gear train when the lever 15 is moved to the manual mode position. For example, if the drive includes an electrically operable clutch, the clutch can be disengaged by a switch which is operable when the lever 15 is moved to the manual mode. Alternatively, such switch can interrupt the power to the motor 33 and an electrically operable clutch would not be necessary. If an electrically operable clutch is used, the releasable coupling between the gears 49 and 9, would be omitted, the gear 40 driving the gear 7 directly. Such switch can be operable by the push rods 11.

However, for reasons previously stated, an electrically operable clutch is not desirable and because of space limitations and the conditions to which the drive is exposed, we have found it to be preferable to use a proximity sensor 53 to detect the manual mode position of the gear 9 to de-energize the motor 33.

Figure 5:
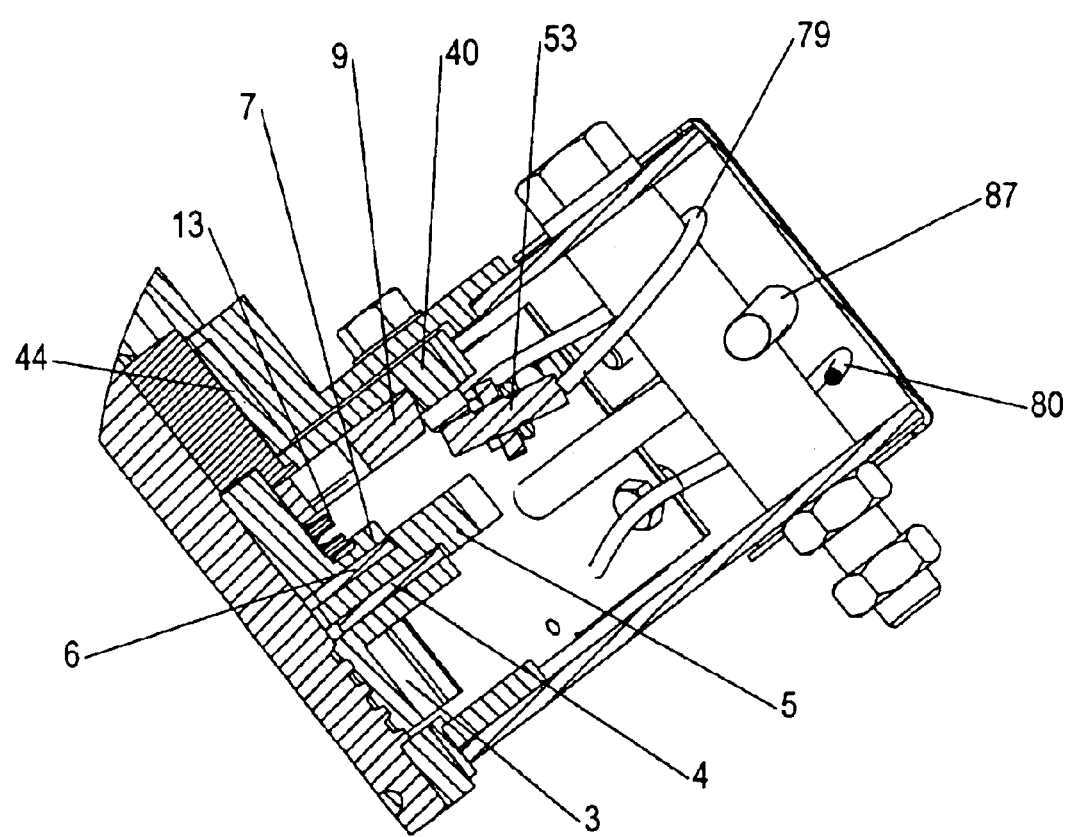
FIG. 5 is an enlarged cross-sectional view of a portion of the drive shown in FIG. 4 and is taken along the line 5—5 in FIG. 4.

With reference to FIG. 5, a proximity sensor or switch 53 is mounted from the housing 1 near the position assumed by the gear 9 when the lever 15 is moved to its manual mode position. Preferably, the sensor switch 53 is a sensor of the type which detects the proximity of ferrous metals and can, for example, be a sensor of the type sold by Omron Electronics, Inc. (address) under Part No. E2E-X1R5E1-M1-N. Such a sensor does not touch a moving part resulting in no wear with use, is not affected by vibration and can detect metal through grease and other materials, such as dirt. This is not true with standard mechanical switches and photoelectric sensors.

Accordingly, when the gear 9 is moved from the electrical mode position shown in FIG. 5 to its manual mode position (see FIG. 3) where the gear 9 is in close proximity to the sensor 53, an electrical indication of such proximity is provided to the motor control 74 by way of an electrical cable 79 which prevents electrical energization of the motor 33 as described hereinafter.

Motor Control

Figure 7A:
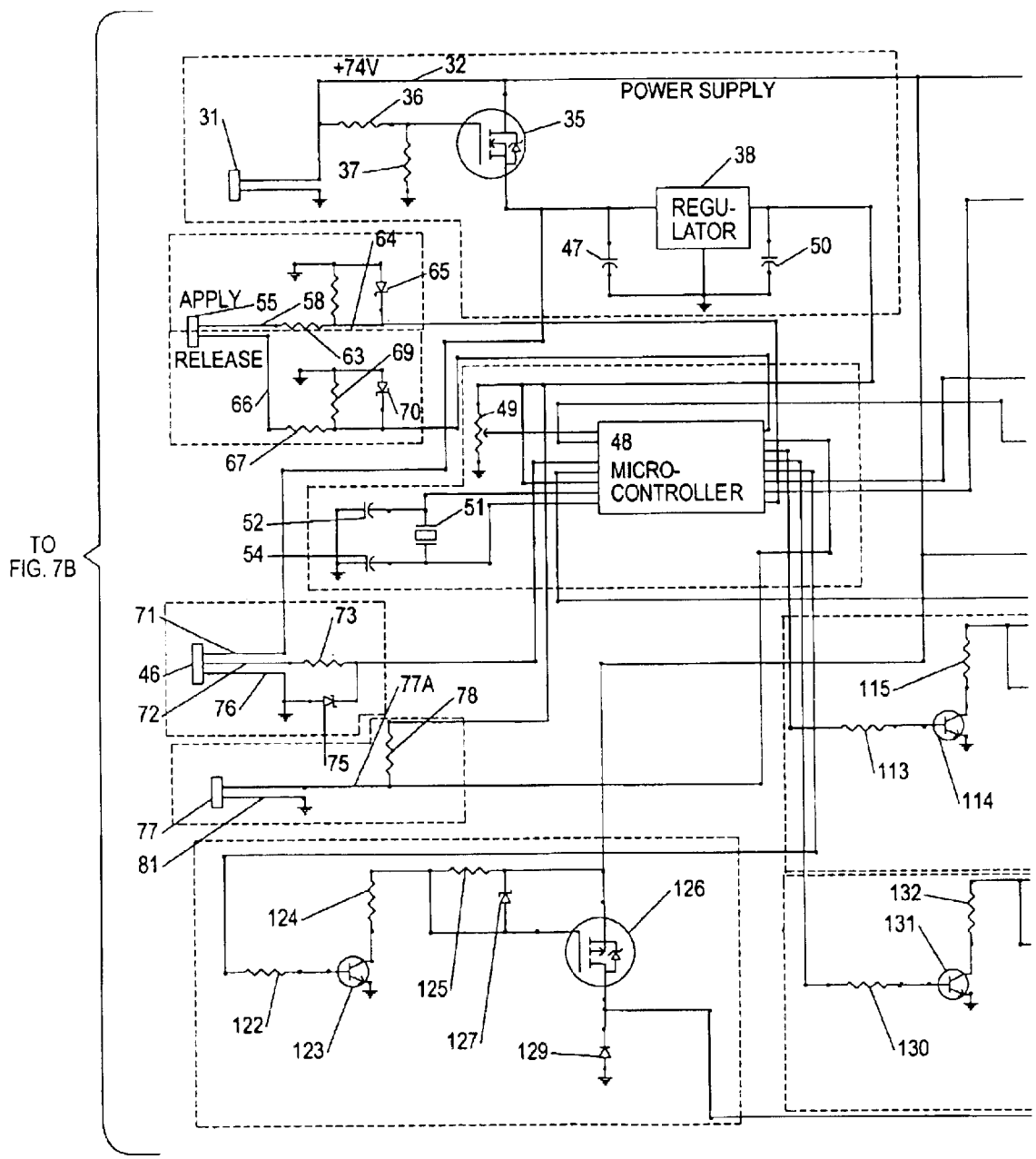
FIGS. 7a and 7b are electrical circuit diagrams of a preferred embodiment of a solid state control used with the drive illustrated in FIGS. 1–6.
Figure 7B:
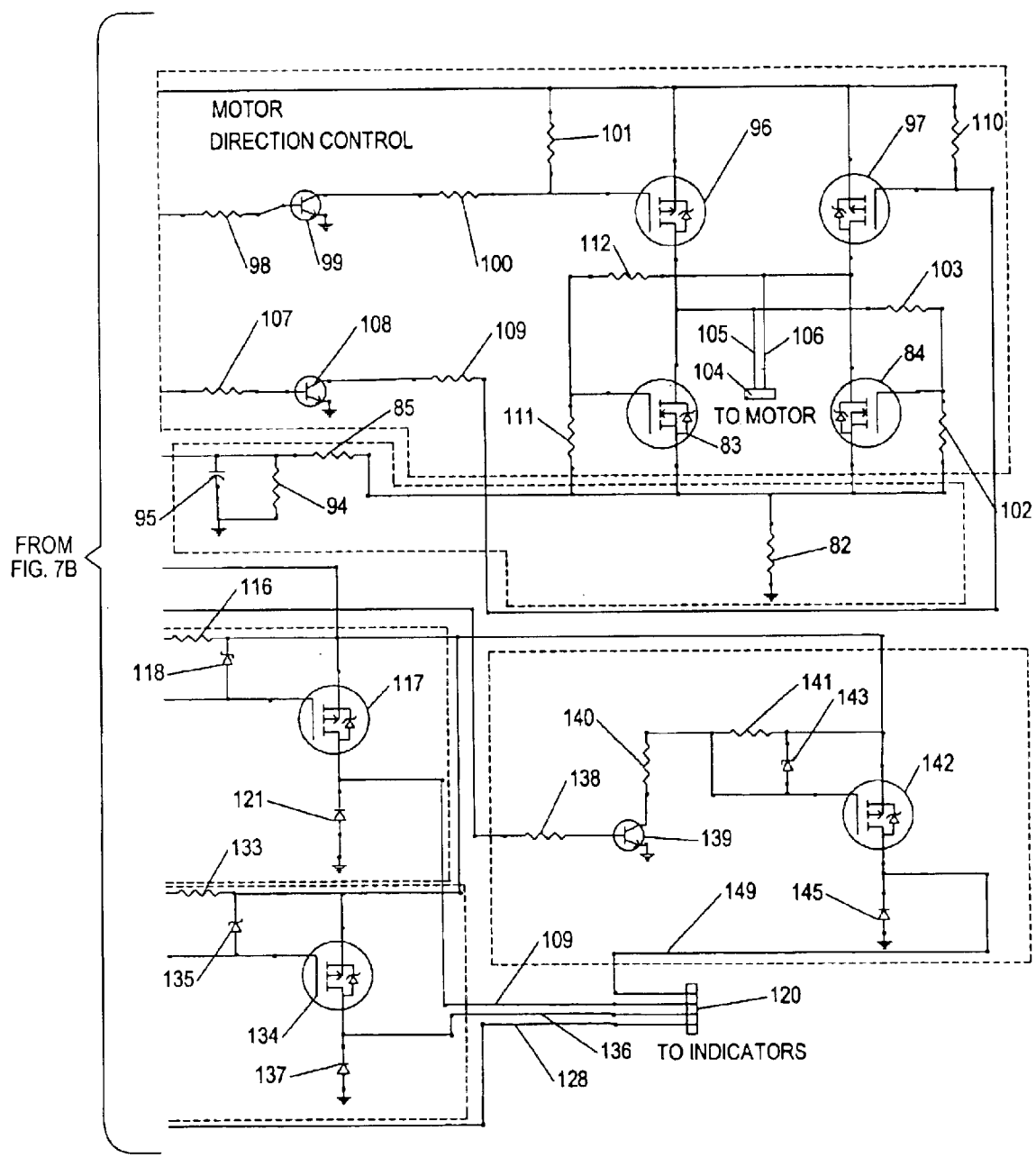

FIGS. 7a and 7b are schematic electrical diagrams of an embodiment of a solid state control circuit for the motor 33 assuming, as in the preferred embodiment, the motor 33 is a reversible direct current motor, the current supplied to the motor 33 increasing with the torque provided at the shaft 41. FIGS. 7a and 7b should be considered with FIG. 7b to the right of FIG. 7a, the circuits of the two Figs. interconnecting. The circuits shown in FIGS. 7a and 7b are contained within the control box 86.

Direct current power is supplied to a connector 31, such as a cable (not shown) connected to a 74 volt battery of a locomotive. The positive line 32 from the connector is connected to the drain pin of transistor 35 and to a voltage divider made up of resistors 36 and 37. Resistors 36 and 37 create a reduced voltage at the gate pin of 35 which is connected as a source-follower circuit to the input of a linear regulator 38. The source-follower circuit creates a reduced voltage of nominally +14 volts DC a the input pin of linear regulator 38 as well as providing power to the switches 88 and 89 used for the manual select input at connector 46. A capacitor 47 smoothes the +14 volts at the linear regulator input pin. Linear regulator 38 reduces the +14 volt input from 35 to +5 volts DC to power the microcontroller 48 and provide a voltage for potentiometer 49. Another capacitor 50 on the regulator output provides reserve current to handle switching surges. Potentiometer 49 provides an adjustable 0 to +5 volt reference control signal to the microcontroller 48.

The microcontroller 48 uses software to process signals from the different inputs and control the output signals that drive the motor and inform the operator of parking brake operation. Although other microcontrollers can be used, one satisfactory microcontroller is one sold by Microchip Technology, Inc., 2355 W. Chandler Boulevard, Chandler, Ariz. 85224 under Part No. PIC 16 C711-04I/P. A quartz crystal 51 and two capacitors 52 and 54 are used to provide a clock signal to the microcontroller 48. The microcontroller has signal lines that can be configured as analog or digital inputs or digital outputs. In this application, the microcontroller 48 is configured with two analog inputs, four digital (switch) inputs, and six digital outputs. The analog inputs go into an Analog to Digital converter (A/D) that can be part of the microcontroller 48 or a separate device.

The potentiometer 49 provides a voltage signal that is used as a reference and uses one of the analog inputs of the microcontroller 48. In software, this reference voltage is compared with a voltage corresponding to the motor 33 current to determine when the desired parking braking chain tension is reached.

The Apply input from the control box 86 or locomotive control panel switch is a +74 volt DC signal that is supplied to the parking brake control circuit through connector 55, line 58. The signal passes through a high value resistor 63 to limit current flow. Resistor 64 holds the control input to electrical ground when no signal is present. When a +74 volt DC signal is present at line 55, a zener diode 65 from electrical ground limits the Apply signal voltage to a digital input of microcontroller 48 to +5 volts DC. In the microcontroller, software checks this input to see if the Apply signal is held at +74 volts DC for at least one half second before processing the signal to operate the parking brake.

The Release input from the control box or locomotive control panel is a +74 volt DC signal that comes into the parking brake control circuit through connector line 66. The signal passes through a high value resistor 67 to limit current flow. Resistor 69 holds the control input to electrical ground when no signal is present. When a +74 volt DC signal is present at line 66, the zener diode 70 from electrical ground limits the Release signal voltage to a digital input of microcontroller 48 to +5 volts DC. In the Microcontroller 48 software checks this input to see if the Release signal is held at +74 volts DC for at least one half second before processing the signal to operate the parking brake.

The manual select input is from the proximity sensor or switch 53 mounted in the parking brake housing (see FIG. 5) which detects when the parking brake has been shifted to manual operation using the lever 15 on the hand wheel 20 mounted on the front of the parking brake. Connector 46 has three connections to the proximity sensor 53. Line 71 carries nominally +14 volts DC from the power supply transistor 35 to the sensor power connection. Line 72 is the input signal connection and goes through resistor 73 to limit current and allow zener diode 15 to limit the input signal voltage to +5 volts DC before connection to a digital input of microcontroller 48. Line 76 is the electrical ground connection to the manual detect sensor 53. The software in the microcontroller reads this signal and, if needed, turns off the parking brake motor 33 and turns on the output for the Manual Engaged indicator light 92. The input Apply and Release switches 88 and 89 are disabled when the parking brake is in manual operation.

The full release limit input is the switch 59 mounted on the parking brake housing 1 which closes when the parking brake chain 68 is released as far as it can and is pulling on the chain anchor. Connector 77 has two connections to the full release limit switch. Connector 77 line 81 is connected to electrical ground for the parking brake electronics. Line 77 is the input signal connection from the switch 59. Resistor 78 pulls the input connection to +5 volts DC when the full release limit switch 59 is open (parking brake is not fully released). When the parking brake chain 68 is released as far as it can the full release switch 59 closes and connects the input signal connection line 81 to electrical ground. The input signal is connected to a digital input of microcontroller 48. The software in the microcontroller reads this signal and, if it is pulled to ground, turns on the Release indicator light 91. If the motor drive output is operating the motor in the release direction, the software will also turn off the motor drive.

Power resistor 82 (FIG. 7*b*) is a low resistance value resistor that carries all motor current. Transistors 83 or 84, depending on gearmotor direction, carry current from the motor to electrical ground through resistor 82. The motor current through resistor 82 creates a voltage drop across resistor 82. Resistors 85 and 94 act as a voltage divider to reduce the voltage across power resistor 82 to within the 0 to +5 volt range of the analog input of the microcontroller 48. The capacitor 95 with resistor 85 act as a filter to reduce noise spikes on the signal to the microcontroller. The microcontroller software reads the voltage representing motor current and compares it to the voltage reference read from potentiometer 49. If the voltage representing motor current exceeds the reference voltage from potentiometer 49, the gearmotor 33 is turned off and the operator Apply light 90 is turned on indicating the parking brake is applied to the desired level. If desired, the comparator circuit, i.e. the resistors and/or the microcontroller can be selected so that they are responsive to environmental temperature changes and the braking force, prior to deenergization of the motor 33, remains substantially constant even though the temperature changes.

Two output signal lines from the microcontroller 48 determine gearmotor 33 direction. The software in the microcontroller is configured to allow only one of these output signal lines to be on at a time. The software has three modes of operation for controlling these signal lines. Turn line one on to apply the parking brake, turn line two on to release the parking brake, and turn both lines off to turn off the gearmotor 33 that moves the parking brake. A set of four power Field Effect Transistors (FET), 96, 83, 97 and 84 are used to control the gearmotor 33. These are wired together to form what is called an H-bridge that can send power to the motor in either direction.

To apply the parking brake, the microcontroller 48 sends +5 volts DC through current limiting resistor 98 to the base of transistor 99 turning it on. Turning on 99 pulls one side of resistor 100 to electrical ground. Resistor 101 normally pulls the gate of the P-channel FET 96 to nominally +74 volts DC. The FET 96 drain pin is connected to +74 volts DC so that when transistor 99 is off the gate pin of FET 86 is at +74 volts DC also which turns the FET 96 off. When transistor 99 is turned on resistors 100 and 101 form a voltage divider and pull the gate pin of FET 96 nominally 12 to 14 volts below the drain pin and turn FET 86 on. This pulls the source pin of FET 96 up to nominally +74 volts DC. Resistor 102 normally pulls the gate of the N-channel FET 84 down to the same level as its drain pin, turning it off. The source pin of FET 86 pulls one side of resistor 103 up to nominally +74 volts DC when 96 is turned on. Resistors 103 and 102 form a voltage divider that pulls the gate pin of FET 84 nominally 12 to 14 volts above the drain pin and turns FET 84 on. This pulls the source pin of FET 84 down toward electrical ground through resistor 82. The gearmotor 33 is hooked up through connector 104. The positive lead of the gearmotor 33 goes to line 105 of connector 104. Line 105 connects to the source pins of FET 96 and 83. The negative lead of the gearmotor 33 goes to line 106 of connector 104. Line 106 connects to the source pins of FET 87 and 84. When the microcontroller turns on transistor 99 the positive lead of the gearmotor 33 is connected to +74 volts through 96 and the negative lead is connected to electrical ground through 84 and resistor 82. When connected to power this way the gearmotor 33 drives the parking brake through its geartrain to apply the parking brake.

To release the parking brake, the microcontroller 48 sends +5 volts DC through current limiting resistor 107 to the base of transistor 108 turning it on. Turning on 108 pulls one side of resistor 109 to electrical ground. Resistor 116 normally pulls the gate of the P-channel FET 108 to nominally +74 volts DC. The FET 97 drain pin is connected to +74 volts DC so when 108 is off the gate pin of FET 97 is at +74 volts DC also which turns the FET 97 off. When transistor 108 is turned on resistors 109 and 110 form a voltage divider and pull the gate pin of FET 97 nominally 12 to 14 volts below the drain pin and turn FET 97 on. This pulls the source pin of FET 97 up to nominally +74 volts DC. Resistor 111 normally pulls the gate of the N-channel FET 83 down to the same level as its drain pin turning it off. The source pin of FET 97 pulls one side of resistor 112 up to nominally +74 volts DC when 97 is turned on. Resistors 112 and 111 form a voltage divider that pulls the gate pin of FET 83 nominally 12 to 14 volts above the drain pin and turns FET 83 on. This pulls the source pin of FET 83 down toward electrical ground through resistor 82. The gearmotor 33 is connected through connector 104. The positive lead of the gearmotor 33 goes to line 105 of connector 104. Line 103 connects to the source pins of FET 96 and 83. The negative lead of the gearmotor 33 goes to line connector 104. Line 106 connects to the source pins of FET 97 and 84. When the microcontroller turns on transistor 108 the negative lead of the gearmotor is connected to +74 volts through 108 and the positive lead is connected to electrical ground through 83 and power resistor 82. When connected to power this way, the gearmotor 33 drives the parking brake through its geartrain to release the parking brake.

The operator power-on signal shows the operator the status of the parking brake control system. The signal can operate a 74 volt DC relay coil to control an indicator within the locomotive control panel. The signal is operated by one of the microcontroller 48 output lines. The microcontroller 48 can turn the signal on continuously to indicate normal operation or it can blink the signal on and off to indicate different non-normal operations.

The microcontroller 48 turns on the signal by putting +5 volts DC on the output line going to resistor 113. Resistor 113 limits the current into the base of transistor 114. This turns on 104 which pulls one end of resistor 115 to electrical ground. Resistor 116 normally pulls the gate pin of P-channel FET transistor 117 to the same voltage as the drain pin of 117, nominally +74 volts, turning 117 off. When transistor 114 is turned on by the current through resistor 113, resistors 115 and 116 form a voltage divider that pulls the gate of 117 below +74 volts. A zener diode 118 keeps the gate of 117 from being pulled too far below +74 volts to protect the FET transistor. When FET 117 is turned on it pulls line 109 of connector 120 up to nominally +74 volts DC. A diode 121 is connected to the same line and electrical ground to protect the transistor 117 from any inductive turn off spikes when a relay coil is connected to the output through connector 120.

The operator apply signal shows the operator the status of the parking brake control system. The signal can operate a 74 volt DC relay coil to control an indicator light 90 within the locomotive control panel. The signal is operated by one of the microcontroller 48 output lines. The microcontroller can turn the signal on continuously to indicate the parking brake is fully applied or it can blink the signal on and off to indicate the parking brake motor is running and the brake is in transit to applying the parking brake.

The microcontroller 48 turns on the signal by putting +5 volts DC on the output line going to resistor 122. Resistor 122 limits the current into the base of transistor 123. This turns on 123 which pulls one end of resistor 124 to electrical ground. Resistor 125 normally pulls the gate pin of P-channel FET transistor 126 to the same voltage as the drain pin of 126, nominally +74 volts, turning 126 off. When transistor 123 is turned on by the current through 122, resistors 124 and 125 form a voltage divider that pulls the gate of 126 below +74 volts. A zener diode 127 keeps the gate of 126 from being pulled too far below +74 volts to protect the FET transistor. When transistor 126 is turned on, it pulls line 128 of connector 120 up to nominally +74 volts DC. A diode 129 is connected to the same line and electrical ground to protect the transistor 126 from any inductive turn off spikes when a relay coil is connected to the output through connector 120.

The operator release light 91 shows the operator the status of the parking brake control system. The signal can operate a 74 volt DC relay coil to control an indicator within the locomotive control panel. The signal is operated by one of the microcontroller 48 output lines. The microcontroller 48 can turn the signal on continuously to indicate the parking brake is fully released or it can blink the signal on and off to indicate the parking brake motor is running and the brake is in transit toward full release of the parking brake.

The microcontroller 48 turns on the signal by putting +5 volts DC on the output line going to resistor 130. Resistor 130 limits the current into the base of transistor 131. This turns on transistor 131 which pulls one end of resistor 132 to electrical ground. Resistor 133 normally pulls the gate pin of P-channel FET transistor 134 to the same voltage as the drain pin of 134, nominally +74 volts, turning transistor 134 off. When transistor 134 is turned on by the current through resistor 130, resistors 132 and 133, transistor 134 form a voltage divider that pulls the gate of 134 below +74 volts. A zener diode 135 keeps the gate of 134 from being pulled too far below +74 volts to protect the FET transistor. When transistor 134 is turned on it pulls line 136 of connector 120 up to nominally +74 volts DC. A diode 137 is connected to the same line and electrical ground to protect the transistor 134 from any inductive turn off spikes when a relay coil is connected to the output through connector 126.

The operator manual-engaged signal light 92 shows the operator the status of the parking brake control system. The signal can operate a 74 volt DC relay coil to control an indicator within the locomotive control panel. The signal is operated by one of the microcontroller 48 output lines. The microcontroller can turn the signal on continuously to indicate the hand wheel on the parking brake has been engaged for manual operation and electrical operation of the parking brake is not possible.

The microcontroller 48 turns on the signal by putting +5 volts DC on the output line going to resistor 138. Resistor 138 limits the current into the base of transistor 139. This turns on transistor 139 which pulls one end of resistor 140 to electrical ground. Resistor 141 normally pulls the gate pin of P-channel FET transistor 142 to the same voltage as the drain pin of 142, nominally +74 volts, turning transistor 142 off. When transistor 130 is turned on by the current through resistor 138, transistor 142, resistors 140 and 141 form a voltage divider that pulls the gate of FET 142 below +74 volts. A zener diode 143 keeps the gate of FET 142 from being pulled too far below +74 volts to protect the FET transistor. When FET 142 is turned on, it pulls line 144 of connector 120 up to nominally +74 volts DC. A diode 145 is connected to the same line and electrical ground to protect the transistor FET 142 from any inductive turn off spikes when a relay coil is connected to the output through connector 120.

Figure 8:
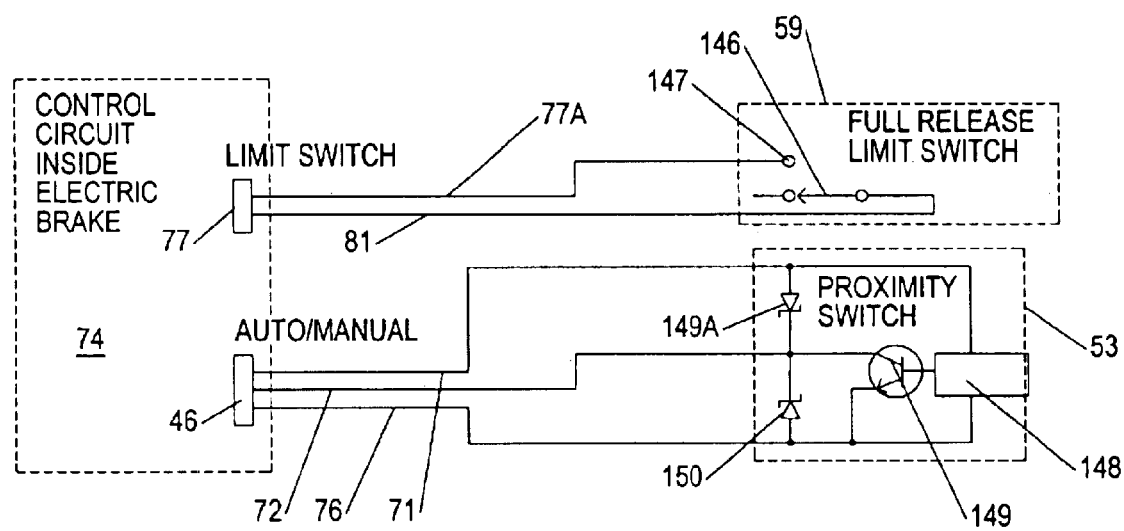
FIG. 8 is an electrical circuit diagram illustrating the circuits for the limit switch and the proximity switch included in the preferred embodiment of the invention.

FIG. 8 is a circuit diagram illustrating the release limit switch 59 and the proximity switch 53 which can be used with the motor control 74. Thus, the arm 60 (FIG. 4) of the limit switch 59 controls the movable member, or arm, 146 engageable with the control 147, the arm 146 and the contact 146 being connected to the motor control circuits through the connector 77.

The proximity switch 53 comprises the magnetic material sensor 148 connected to the pins of the connector 46 through a transistor 149 and the corresponding wires 71, 72 and 76. Zener diodes 149A and 150 protect the sensor 148 with respect to overvoltages.

Figure 9:
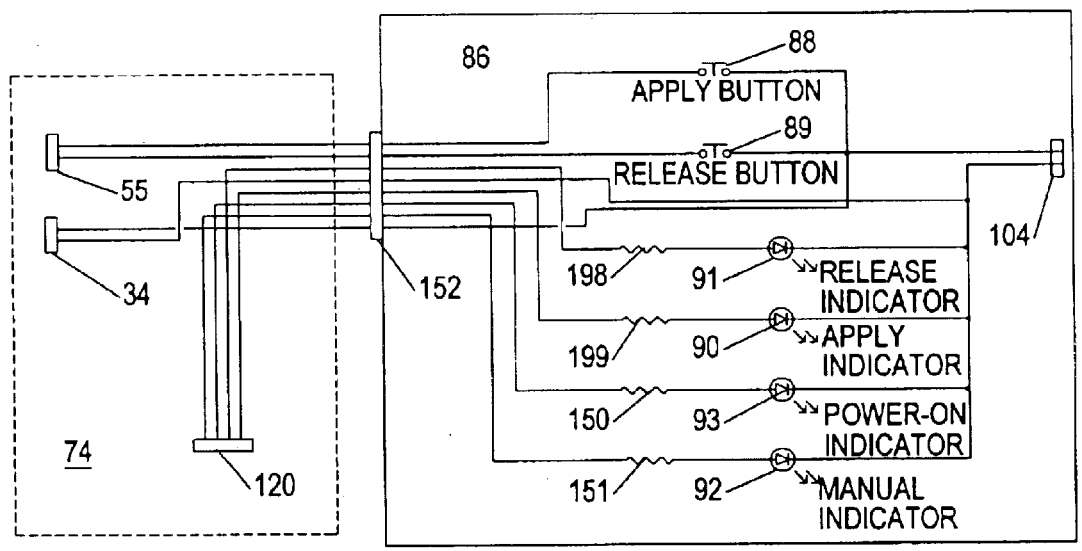
FIG. 9 is an electrical circuit diagram of the control box shown in FIG. 1.

FIG. 9 is a circuit diagram illustrating the circuits and devices which can be within the control box 86 (see FIG. 1) and their electrical connections to the motor control 74. The indicator lights 90–93 can, for example, light emitting diodes electrically connected to the circuits in the control box 74 through current limiting resistors 148, 149, 150 and 151 and a connector 152. The lights 90–93 can provide light of different colors, e.g. 90 and 92 can emit red light, 93, green light and 91, yellow light.

In some railway car systems, the brakes are applied and released using radio frequency, electromagnetic signals transmitted in free space from the locomotive to a receiver of such signals at the railway cars. The parking brake drive of the invention can be similarly actuated by transmitting such signals from the locomotive or from some other location, e.g. from a hand held transmitter.

Figure 10:
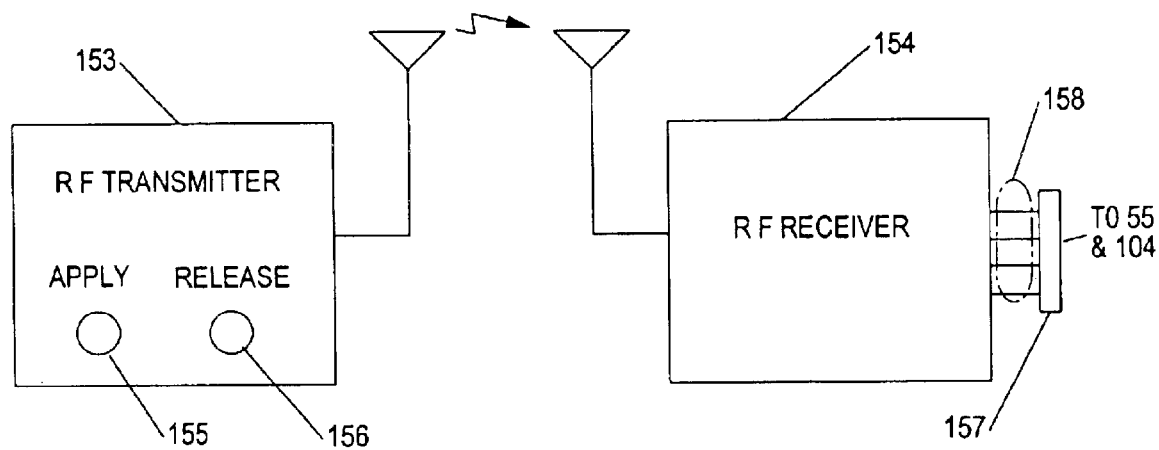
FIG. 10 is a block diagram illustrating wireless remote control of the application and release of the parking brakes.

FIG. 10 illustrates schematically equipment for actuating the brake drive without an electrical cable interconnecting the motor control 74 and manual switches for applying and releasing the brakes. Thus, as illustrated in FIG. 10, such equipment comprises a known type of transmitter 153 which transmits radio frequency electromagnetic energy signals in free space which is received by a known type of receiver 154. The receiver can be included in the motor control 74 or can be a separate unit. The transmitter transmits a first signal when the "apply" button 155 is manually operated and a second signal when the release button 156 is manually operated. Operation of the buttons 155 and 156 can, for example, operate switches which determine the signal transmitted. The signals transmitted can, for example, be of different frequencies, one for "apply" and a different one for "release", or the signals can be differently modulated.

At the receiver 154, the received signals are used, like the switches 88 and 89, to determine which of the lines, 58 or 66, voltages are applied to control the motor 33. The receiver 154 can be connected to the connectors 55 (FIG. 7*a*) and 104 (FIG. 7*b*) by a connector 107 and electrical wires 108.

Electrical Brake Application

When the parking brake is applied in the electrical mode, the operator will press and momentarily hold the apply button 88. An electrical signal nominally 74 volts DC, will be sent to the parking brake controller 74 through the cable 87. The microcontroller 48 in the parking brake controller 74 will process this signal and send a nominal 74 volt DC signal to the gear motor 33.

The gear motor 33 will rotate the gear 39 at a predetermined speed. The gear 39 engages and rotates the gear 40. The lugs or projections 40*a* of the gear 40 engage the sensor coupling 9. The sensor coupling 9 is kept in contact with the gear 40 due to the spring 13. The sensor coupling 9 is axially splined to and rotates the driver 7. The driver 7 is axially and non-rotatably fixed to the shaft 2 which causes rotation of the shaft 2. A face of the driver 7 is in axial contact with the friction disc 6. The opposite face of the friction disc 6 is in axial contact with a ratchet wheel 5 which is concentric to the shaft 2. The opposite face of the ratchet 5 is in contact with another friction disc 4. Since the gear 3 is loosely threaded to the shaft 2, and rotation thereof is resisted by the gear 24, the gear 3 will move axially toward the disc 4 and press it against the ratchet wheel 5 which clamps the ratchet wheel 5 between the two discs 4 and 6, and hence, the driver 7 and the gear 3 can no longer rotate on the shaft 2, and the gear 3 rotates with the shaft 2 causing rotation of the double gear 24.

The double gear 24 engages a chain gear 21 which has an outer portion made of spur gear teeth and multiple pockets which fit snuggly with a chain 68. As the double gear 24 rotates the chain gear 21 will rotate in an opposite direction about its shaft 25. As the chain gear 21 rotates the chain 68 will feed into the pockets causing the chain 68 to travel up and around the chain gear 21. As the chain 68 travels into the locomotive parking brake, the brake rigging will apply the brake shoes against the wheels of the locomotive.

The gear motor 33 has a linear relationship between the output torque and the amount of electrical current it requires. When the parking brake is being applied electrically, the microcontroller 48 in the parking brake controller 74 monitors the electric current the gear motor draws. The software in the microcontroller in the parking brake controller 74 compares the electric current level with a preset number. When the electric current reaches the preset level, the microcontroller in the parking brake controller 74 shuts off power to the gear motor 33 and sends an electric signal to the applied light in the control box 86 via cable 87.

Electrical Brake Release

When the parking brake is to be released, the operator presses the release button 89 on the control box 86. An electrical signal is sent from the control box 86 to the parking brake controller 74 via cable 87. The microcontroller 48 in the parking brake controller 74 receives this signal and processes it to operate the gear motor 33 in the reverse direction. As the gear motor 33 output shaft is rotating in the clockwise direction the gear 40 will rotate in the counter clockwise direction. The gear 40 is locked to the sensor coupling 9 by the lugs on the gear 4. The sensor coupling 9 will rotate in the counter clockwise direction which causes the driver 7 to rotate in the counter clockwise direction. Since the driver 7 face is in contact with a friction disc 6, the friction disc 6 will rotate in the same direction. The friction disc 6 has an opposite face which is engaged with the ratchet 5. The ratchet wheel 5 will try to rotate in the counter clockwise direction but is held from rotating in the counter clockwise direction since the teeth on the outside diameter of the ratchet 5 are engaged by the pawl 45. The pawl 45 is kept engaged with the ratchet wheel 5 due to the spring 8. Since the pinion 3 is threaded onto the shaft 2, the pinion 3 will move axially towards the rear of the parking brake just enough to allow the friction disc 6 and friction disc 4 to slip which permits the shaft 2 to rotate in the brake release direction. Rotation of the shaft 2 causes the pinion gear 3 to rotate in the counter clockwise direction.

As the pinion gear 3 rotates in the counter clockwise direction, the double gear 24 will rotate in the clockwise direction. As the double gear 24 rotates the chain gear 21 will rotate in an opposite direction about its shaft 25. As the chain gear 21 rotates, the chain 68 travels out of the housing 1 and the brake rigging will move the brake shoes away from the wheels of the vehicle. As the chain 68 continues to travel, the last link of the chain 68 will pivot the attached linkage 61 about its shaft 34. Linkage 61 will raise link 62 which is attached to the enclosed heavy duty micro switch 59. When the micro switch 59 contacts open, an electrical signal is sent to the parking brake controller 74 through the cable 80. The microchip in the parking brake controller 74 processes this signal and shuts off power to the gear motor 33 and sends a signal to the control box 86 to illuminate the released light 91.

Manual Brake Application

When the parking brake is to be operated manually, the operator will pull on the spring 18 biased plunger 16 via the knob 17. While holding the hand wheel 20 with one hand the operator will rotate the lever assembly 15 counter clockwise 270° until the spring 18 biased plunger 16 enters into the "manual" hole 27 in the hand wheel 20. The lever assembly 15 rotates about the shaft 2. The lever assembly 15 has a projection 15a which is threaded. As the lever assembly 15 is rotated, the follower 19, which is keyed to the hand wheel 20 and has an internal thread in contact with the threaded projection of the lever assembly 15, will move axially a set distance away from the operator. This causes the push rods 11 to move axially away from the operator. The follower 19 has lug like protrusions 19b on the rear which engage the sides of the plurality of push rods 11. The push rods 11 are fixed to the shaft 2 via collar 26. As the push rods 11 travel axially, they engage the spring 13 biased sensor coupling 9. As the push rods 11 continue to travel axially, the spring 13 compresses and the sensor coupling 9 travels axially on the shaft 2 and disengages the lugs 40a on the gear 40 thereby interrupting the gear motor 33 drive. The sensor coupling 9 traveled axially on the shaft enough to actuate the proximity sensor 53. The proximity sensor 53 sends an electrical signal to the parking brake controller 74 via the cable 79. The microcontroller 48 in the parking brake controller 74 processes this signal and shuts off any electrical signals to the gear motor 33 and sends a signal to the control box 86 to illuminate the manual light 92. This prevents the parking brake from being operated electrically while the lever assembly 15 plunger 16 is in the "manual" hole 27 in the hand wheel 20.

The lug like protrusions 19b on the follower 19 engage the sides of the plurality of push rods 11. Since the follower 19 is axially keyed to the hand wheel 20 and when the hand wheel 20 is rotated in either direction, the follower 19 will cause the plurality of push rods 11 to rotate about the axis of the shaft 2. Since the plurality of push rods 11 are fixed to the shaft 2, the shaft 2 will rotate in the same direction as the hand wheel 20. As the shaft 2 rotates in the brake apply direction, the drive parts function as described in connection with rotation of the shaft 2 by the motor 33 except for the interruption of the motor 33 connection to the shaft 2.

Manual Brake Release

The shaft 2 is rotatable in both the brake apply and the brake release directions by the hand wheel 20 when the lever assembly is in the manual operating position, i.e. the plunger 16 is in the hole 27. To release the brakes manually, the hand wheel 20 is rotated in the counter clockwise direction, as viewed in FIG. 1, which causes the drive shaft 2 to rotate in the same direction. Such reverse rotation of the shaft 2 causes the brakes to be released in the manner described hereinbefore in connection with reverse rotation of the shaft 2 by the electric motor 33.

It will be apparent that when the lever 15 is positioned in the automatic or electrical mode, as shown in FIGS. 1 and 2, there is no driving connection between the shaft 2 and the hand wheel 20. Therefore, the wheel 20 does not drive when the shaft 2 is rotated by the electric motor 33. Accordingly, the wheel 20 remains motionless, or substantially motionless, when the brakes are being applied or released by the electric motor 33.

Similarly, when the lever 15 is positioned in the manual mode (see FIG. 3), the hand wheel 20 does not rotate the gear 40 and hence, the shaft 41 of the electric motor 33.

Also, it should be noted that when the brakes are being released by rotation of the hand wheel 20, there is no "spinning" of the hand wheel 20 by the pull of the chain gear 68 and the rotation of the chain drive gears. Instead, there is a gradual release of the brakes dependent upon the amount of manual rotation of the hand wheel 20. Thus, as described hereinbefore, rotation of the shaft 2 in the release direction causes unclamping of the ratchet wheel 5, but if the chain gear 21 attempts to rotate the gear 3 faster than the shaft 2 is rotated, the ratchet wheel 5 is reclamped and stops, or slows, rotation of the shaft 2. Therefore, to fully release the brakes, an operator must continue to rotate the hand wheel 20 until the brakes are fully released.

In the preferred embodiment, the manual drive member for rotating the shaft 2 is a hand wheel, the hand wheel 20, because setting or release of the brakes does not require reciprocation of the drive member. However, if desired, a prior art reciprocable lever coupled to the drive shaft 2 by a ratchet and pawl mechanism can be substituted for the hand wheel 20.

If desired, the microcontroller 48 can include software of the kind known to those skilled in the art which will periodically, or upon the manual closing of a "test" switch, perform testing of the various electrical functions to thereby detect any malfunctions of electrical systems or components.

Although preferred embodiments of the present invention have been described and illustrated, it will be apparent to those skilled in the art that various modifications may be made without departing from the principles of the invention.

What is claimed is:

1. An electrically operable brake drive for a vehicle having wheels, having braking apparatus for applying a braking force to at least one of the wheels to thereby set a brake of the vehicle and for reducing the applied braking force to thereby release the brake of the vehicle and having a force transmitting means for coupling the braking apparatus to the drive, said brake drive comprising:

a plurality of drivingly coupled and rotatable gears, one of the gears including coupling means for coupling one of the gears to the force transmitting means for setting and releasing the brake depending on the direction of rotation of said one of the gears;

an electrically operable motor with a rotatable and reversible drive member coupled to a gear of the plurality of gears and alternatively rotatable in a first direction for rotating the gears in the brake setting direction and in a second, opposite direction for rotating the gears in the brake releasing direction;

a detent mechanism coupled to the gears for preventing rotation of the gears in the brake release direction when the drive member is rotated in the first direction and for permitting rotation of the gears in the release direction when the drive member is rotated in the second direction; and an electrical control system for controlling the direction of rotation of the drive member for setting and releasing the brake without manual readjustment of the drive.

2. A brake drive as set forth in claim 1 wherein the plurality of gears comprises a drive gear coupled to the one gear for rotating the one gear and a rotatable drive shaft coupled to, and rotatable by, the electric motor drive member and coupled to the drive gear for rotating the drive gear and wherein the detent mechanism is coupled to said drive shaft by a drive shaft rotation direction dependent coupler which permits the one gear to rotate in the brake setting direction and prevents rotation of the one gear in the brake release direction when the drive shaft and the one gear are rotated in the brake setting direction but which permits the one gear to rotate in the brake release direction when the drive shaft is rotated in the brake release direction.

3. A brake drive as set forth in claim 2 wherein the drive shaft has a longitudinal axis of rotation and the drive shaft is coupled to the drive gear by cam means which causes the drive gear to move axially of the drive shaft in a first direction when the drive shaft is rotated in the brake setting direction and which causes the drive gear to move axially of the drive shaft in a second opposite direction when the drive shaft is rotated in the brake release direction and wherein the detent mechanism comprises a toothed ratchet gear rotatably mounted on the drive shaft and a pawl engageable with the teeth of the ratchet gear to prevent rotation of the ratchet gear in a first direction, axial movement of the ratchet gear on the drive shaft in the first direction of axial movement of the drive gear being limited, said drive gear being coupled to the ratchet gear when the drive gear moves in the axial first direction of the drive gear to cause the ratchet gear to rotate in a second direction with the drive shaft when the drive shaft is rotated in the brake setting direction whereby rotation of the drive gear and the one gear on the brake release direction is prevented but is permitted when the drive shaft is rotated in the brake release direction.

4. A brake drive as set forth in claim 2 wherein the electric motor drive member is coupled to the drive shaft by a releasable coupling which, when actuated, uncouples the drive member from the drive shaft.

5. A brake drive as set forth in claim 4 wherein the releasable coupling is manually releasable.

6. A brake drive as set forth in claim 5 further comprising a manually operable drive member coupled to the drive shaft for manually rotating the drive shaft for manually setting and releasing the brake.

7. A brake drive as set forth in claim 6 wherein the manually operable drive member is coupled to the drive shaft by a releasable coupling.

8. A brake drive as set forth in claim 7 wherein the releasable coupling for coupling the drive shaft is manually releasable.

9. A brake drive as set forth in claim 8 farther comprising a manually operable member coupled to both the manually releasable coupling for coupling the drive member to the drive shaft and the manually releasable coupling for coupling the manually operable drive member to the drive shaft for alternatively coupling the drive member to the drive shaft and coupling the manually operable drive member to the drive shaft.

10. A brake drive as set forth in claim 9 wherein the manually operable drive member is a hand wheel.

11. A brake drive as set forth in claim 1 wherein the electrically operable motor includes the drive member and the drive member direction of rotation depends upon the electrical energization of the motor and the electrical control system controls the energization of the motor.

12. A brake drive as set forth in claim 11 wherein the electrical control system comprises electronic components for supplying electrical energy to the motor causing the drive member to rotate in a first direction or in a second direction.

13. A brake drive as set forth in claim 12 wherein the electronic components are controllable by manually operable switches.

14. A brake drive as set forth in claim 12 wherein the electronic control system further comprises a limit switch coupled to the electronic components and operable when the brakes are at least substantially released to stop the electrically operable motor, the limit switch being operable by one of the one gear, the coupling means and the force transmitting means.

15. A brake drive as set forth in claim 12 wherein the current drawn by the electrically operable motor is dependent upon the rotation driving force supplied by the motor and wherein the electronic control system further comprises a source of electrical energy coupled to the motor for energizing the motor, a comparator circuit for determining when the current reaches a predetermined value, the comparator being coupled to the motor electrical source and to the electronic components for stopping the motor when the current reaches the predetermined value.

16. A brake drive as set forth in claim 12 wherein the brake drive further comprises a manually operable drive member for rotating said one gear, a manually operable coupler interconnecting the motor and the gears for mechanically and alternatively permitting the motor to rotate the gears and to prevent the motor from rotating the gears and a manually operable control member for operating the manually operable coupler and wherein the electrical control system further comprises a switch operable by one of the manually operable control member and the manually operable coupler and coupled to the electronic components for stopping the motor when the manually operable coupler prevents the motor from rotating the gears.

17. A brake drive as set forth in claim 16 wherein the switch is a proximity sensor switch responsive to the position of said one of the manually operable control member and the manually operable coupler.

18. A brake drive as set forth in claim 1 wherein the electrical control system comprises a receiver for receiving electromagnetic signals transmitted in free space and the received signals control the direction of rotation of the drive member.

19. An electrically operable brake drive for a vehicle having wheels, having braking apparatus for applying a braking force to at least one of the wheels to thereby set a brake of the vehicle and for reducing the applied braking force to thereby release the brake of the vehicle and having a force transmitting means for coupling the braking apparatus to the drive, said brake drive comprising:

a plurality of drivingly coupled and rotatable gears, one of the gears including coupling means for coupling one of the gears to the force transmitting means for setting and releasing the brake depending on the direction of rotation of said one of the gears;

a bi-directional, electrically operable motor with a drive member coupled to a second one of the gears for rotating said one of the gears in either the brake setting or brake releasing direction;

a uni-directional detent mechanism; and a rotation direction dependent coupler for coupling a rotatable gear of the plurality of gears to the detent mechanism for permitting rotation of the rotatable gear in the brake setting direction and preventing rotation of the rotatable gear in the brake release direction when the drive member rotates the second one of the gears in the brake setting direction but permitting rotation of the rotatable gear in the brake release direction when the electric motor rotates the second one of the gears in the brake release direction.

20. A brake drive as set forth in claim 19 wherein the detent mechanism comprises:

a ratchet gear for rotation in a first direction when the rotatable gear is rotated in the brake setting direction;

a pawl engaging the ratchet gear and preventing rotation of the ratchet gear in a second, opposite direction and wherein the rotation direction dependent coupler comprises:

a releasable coupling interconnecting the ratchet gear and the rotatable gear for rotation together when the rotatable gear is rotated in the brake setting direction and disconnecting the ratchet gear and the rotatable gear when the drive member rotates the second one of the gears in the brake release direction.

21. The method of controlling the setting and releasing of a brake or a vehicle having wheels, having braking apparatus for applying a braking force to at least one of the wheels by the brake and having force transmitting means coupled to the braking apparatus, the method comprising:

providing an electrically operable motor with a rotatable and reversible drive member;

providing a plurality of drivingly coupled rotatable gears;

providing a coupling between one of the gears and the force transmitting means for transmitting a braking force to the braking apparatus with rotation of the one of the gears;

coupling the drive member to one of the gears for rotating the gears; rotating the drive member in a first direction to set the brakes and in a second direction to release the brakes; and providing a detent mechanism which is coupled to the gears and which in response to rotation of the drive member in the first direction prevents release of the brakes and in response to rotation of the drive member in the second direction permits release of the brakes.

22. The method as set forth in claim 21 wherein providing a detent mechanism comprises:

providing a rotatable ratchet gear;

providing a pawl engaging the ratchet gear which prevents rotation of the ratchet gear in a first direction but permits rotation of the ratchet gear in a second direction;

providing a releasable coupling between the ratchet gear and one of the plurality of gears, the releasable coupling causing the ratchet gear to rotate in the second direction and with the last-mentioned one of the gears when the drive member rotates in its first direction to set the brakes and permitting the last-mentioned one of the gears to rotate independently of the ratchet gear when the drive member rotates in the second direction to release the brakes.

* * * * *